No. 705,719. Patented July 29, 1902.
W. H. THOMPSON.
TRACE FASTENER.
(Application filed Feb. 25, 1902.)
(No Model.)
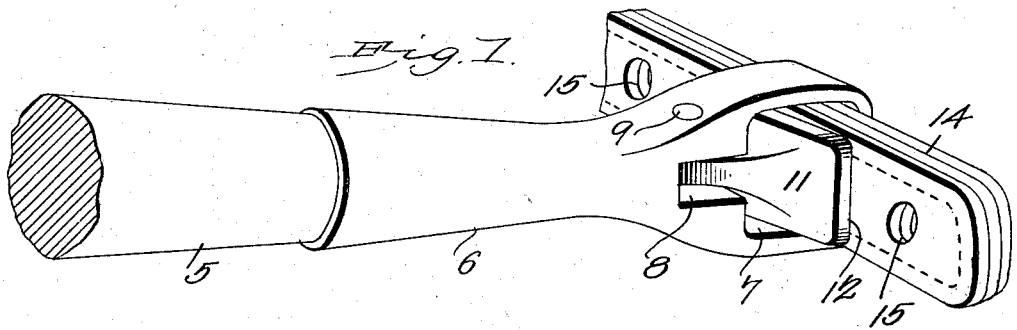
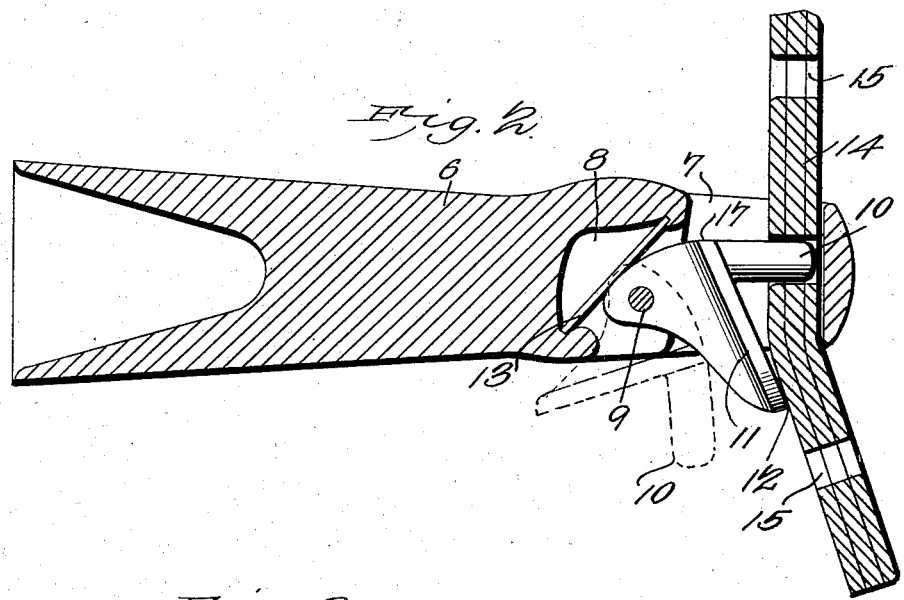
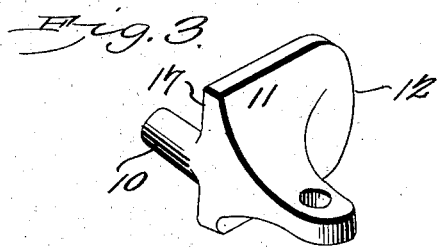
Witnesses
E. L. Steward
C. N. Woodward.
W. H. Thompson, Inventor.
by C. A. Snow & Co.
Attorneys
THE NORRIS PETERS CO., PHOTO-LITHO., WASHINGTON, D. C.

UNITED STATES PATENT OFFICE.

WILLIAM H. THOMPSON, OF MARINETTE, WISCONSIN, ASSIGNOR OF ONE-HALF TO JOSEPH B. EGGENER, OF MARINETTE, WISCONSIN.

TRACE-FASTENER.

SPECIFICATION forming part of Letters Patent No. 705,719, dated July 29, 1902.

Application filed February 25, 1902. Serial No. 95,581. (No model.)

*To all whom it may concern:*

Be it known that I, WILLIAM H. THOMPSON, a citizen of the United States, residing at Marinette, in the county of Marinette and State of Wisconsin, have invented a new and useful Trace-Fastener, of which the following is a specification.

This invention relates to devices for detachably connecting traces to whiffletrees, and has for its object the production of a device whereby the trace is securely held by two independently-acting means, so that if one means fails to act or the trace becomes partially torn asunder the other means will be sufficient to hold the trace.

The invention consists more particularly in a double-acting lever or a combined lever and clamp serving to support the trace with two independent forces and yet working in unison to afford a double grip or holding means to secure the trace.

The device may be applied to any form of whiffletree and to either single or double harness, and for the purpose of illustration I have shown it in the drawings applied to one end of an ordinary whiffletree.

Figure 1 represents a perspective view of a portion of one end of a whiffletree with one of my attachments in position thereon; Fig. 2, a longitudinal section of the same, and Fig. 3 a perspective view of the combined clamp and lever detached.

The whiffletree is represented at 5 with a shank or socket 6 attached thereto, the outer end of the socket having a transverse aperture 7 therethrough, as shown. In the inner side of this aperture or within the body of the stock and opening into the aperture 7 is a cavity 8, in which the combined lever and clamp is pivoted by a vertical rivet or pin 9. This lever-clamp terminates in a pin or stud 10 and is formed with a broad rearwardly-projecting cam-surface 11, slightly inclined outwardly from a right angle to the horizontal plane of the lever or to a line passing through the center of the stud 10 and the pivotal point 9, as clearly shown in Fig. 2. The part 11 will extend some distance in the rear of the general surface of the part of the stock 5, forming the closure to the aperture 7, as shown in Figs. 1 and 2, and adjacent to the rear edge 12 of the closure. The lever-clamp will be maintained normally in its closed position by a spring 13, acting on the inner end of the lever, as shown in Fig. 1.

The trace is represented at 14, and will be formed with the usual spaced perforations 15 to receive the stud 10, as shown in Fig. 2.

When the trace is to be connected to the whiffletree, the free end of the trace is simply forced rearwardly through the aperture 7 and against the stud 10, which will cause the clamp-lever to swing rearwardly upon its pivot 9 until the stud 10 engages the desired perforation 15, when the coupling will be complete. Thereafter any forward strain upon the trace will cause the extremity 12 of the part 11 to be drawn tightly against the trace and clamp it firmly between the part 11 and the corner 15 of the outer end of the stock 5, and securely support it in that position independently of the holding force exerted by the stud 10. The "heel" 17 of the clamp portion 11 of the lever will thus at no time ever come in contact with or exert any pressure upon the trace. Hence the whole strain will be borne by the outer end 12, which, being provided with a comparatively sharp or V-shaped corner, will exert a positive grip or holding force upon the trace and tending to bend it over the corner 15 and preventing any possibility of slipping, and affording thereby a positive firm "grip," whose tenacity will be increased by any increase of the strain upon the trace. Thus if by any means the trace should become partially severed at the perforation 15, which for the time being is engaged by the stud 10, the part 11 would hold the trace with sufficient firmness to securely retain it and prevent accident because of the fracture. This is a very important feature of the invention and insures a two-fold holding force which renders accidental displacement very remote.

The construction is so extremely simple that it can be constructed very cheaply, while at the same time will be very durable and not liable to become disarranged or out of order. Another great advantage secured by this construction is the very material lessening of the wear and strain upon the trace, as the extended surface of the part 11 distributes the strain or grip over a very large area of the trace and largely, if not entirely, relieves the trace from any strains at the points of the perforations 15, which are always the weakest parts of the trace.

While I have shown the device attached to the end of a whiffletree, it can be employed with equal facility in securing other parts of the harness—for instance, upon neck-yokes or at any other point where straps are united—and I do not wish, therefore, to be limited to its use upon any particular part of the harness or parts connected therewith.

Having thus described my invention, I claim—

1. A trace-fastener having a transverse aperture for the reception of a trace, and a pivoted lever mounted within the aperture with its pivotal point adjacent to one wall thereof and having a stud extending toward and terminating short of the opposite wall of the aperture to engage a perforation in a trace, and also having an arm extending rearwardly from the stud to bear laterally against a trace engaged by the stud and force it into frictional contact with the wall of the aperture.

2. A trace-fastener having a transverse aperture for the reception of a trace, and a lever pivoted for swinging movement within said aperture with its pivotal point adjacent to one wall of the aperture, said lever having a stud extending toward and terminating short of the opposite wall of the aperture to engage a perforation in a trace, and also having an arm extending rearwardly from the stud and projecting beyond the aperture to bear laterally against a trace in rear of the rear edge of the aperture-wall to bend the trace laterally in rear of the aperture.

3. A trace-fastener having an aperture for the reception of a trace, and a lever pivoted for swinging movement within the aperture with its pivotal point adjacent to the inner wall of the aperture and having an outwardly-extending stud swinging out of contact with the outer wall of the aperture to engage an opening in a trace and having an arm extending diagonally rearward and outward from the stud to bear terminally against a trace in rear of said outer wall of the aperture to deflect a trace laterally in rear of the rear edge of said wall.

4. In a trace-fastener, the combination with a whiffletree, of sockets upon its extremities with transverse apertures therethrough, levers pivotally supported in said apertures, and with studs upon their outer free ends, springs disposed to yieldably retain said lever projected or withdrawn, bearing-surfaces projecting from said levers and extending in the rear of said socket and inclined outwardly and rearwardly, and traces having spaced perforations and adapted to pass through said apertures with one of its perforations engaged by said stud, and with the rear end of said bearing-surface engaging the trace in the rear of the socket, substantially as described.

In testimony that I claim the foregoing as my own I have hereto affixed my signature in the presence of two witnesses.

WILLIAM H. THOMPSON.

Witnesses:
L. K. MacNeill,
John Philip.